(12) United States Patent
Lee

(10) Patent No.: US 9,266,663 B1
(45) Date of Patent: Feb. 23, 2016

(54) COFFEE FILTER ROLL, COFFEE FILTER DISPENSING SYSTEM, AND A METHOD OF DISPENSING ROLLED COFFEE FILTERS

(71) Applicant: Ronald T. Lee, Huntsville, OH (US)

(72) Inventor: Ronald T. Lee, Huntsville, OH (US)

( * ) Notice: Subject to any disclaimer, the term of this patent is extended or adjusted under 35 U.S.C. 154(b) by 0 days.

(21) Appl. No.: 14/172,682

(22) Filed: Feb. 4, 2014

Related U.S. Application Data

(60) Provisional application No. 61/761,958, filed on Feb. 7, 2013.

(51) Int. Cl.
| | |
|---|---|
| *A47K 10/24* | (2006.01) |
| *B65H 1/00* | (2006.01) |
| *B65D 83/08* | (2006.01) |
| *B26F 3/02* | (2006.01) |
| *A62B 7/10* | (2006.01) |

(52) U.S. Cl.
CPC .............. *B65D 83/0894* (2013.01); *B26F 3/02* (2013.01); *A62B 7/10* (2013.01)

(58) Field of Classification Search
CPC .......... B65D 83/0894; B26F 3/02; A62B 7/10
USPC ............... 210/387, 493.4, 483, 488; 221/210, 221/255, 1, 48; 128/205.27
See application file for complete search history.

(56) References Cited

U.S. PATENT DOCUMENTS

| | | | | |
|---|---|---|---|---|
| 1,682,933 A | * | 9/1928 | Potts ....................... | A47F 1/085 206/499 |
| 2,104,931 A | * | 1/1938 | Mandell ................ | B65B 7/2807 271/108 |
| 2,104,972 A | * | 1/1938 | Cunningham ....... | G05B 11/016 236/74 R |
| 2,234,397 A | * | 3/1941 | Bentz ...................... | A47J 31/06 210/455 |
| 3,567,033 A | * | 3/1971 | Whelan ................ | B01D 23/005 210/497.2 |

(Continued)

FOREIGN PATENT DOCUMENTS

DE       202005005801 U1 * 9/2005

OTHER PUBLICATIONS

Coffee Filter Dispenser Buyers Guide, Ultimate Coffees Info Website, Web page <http://www.ultimate-coffees-info.com/coffee-filter-dispenser.html>, 4 pages, dated Jan. 2, 2011, retrieved from Internet Archive Wayback Machine <https://web.archive.org/web/20110102133643/http://www.ultimate-coffees-info.com/coffee-filter-dispenser.html> on Jul. 4, 2014.

(Continued)

*Primary Examiner* — Rakesh Kumar
(74) *Attorney, Agent, or Firm* — The Law Office of Patrick F. O'Reilly III, LLC

(57) ABSTRACT

A coffee filter roll is disclosed herein. The coffee filter roll includes a plurality of coffee filters successively arranged in a roll configuration, each of the plurality of coffee filters being detachably coupled to one another and including a plurality of fold lines configured to facilitate an insertion of each of the plurality of coffee filters into a coffee filter basket of a coffee maker; and a plurality of lines of weakness, each of the plurality of lines of weakness being disposed between adjacent coffee filters in the coffee filter roll. Each coffee filter is configured to be separated from the coffee filter roll by tearing the coffee filter being removed from the adjacent coffee filter in the coffee filter roll along at least one of the plurality of lines of weakness. A coffee filter dispensing system and a method of dispensing rolled coffee filters is also disclosed herein.

14 Claims, 12 Drawing Sheets

(56) References Cited

U.S. PATENT DOCUMENTS

| | | | | |
|---|---|---|---|---|
| 3,767,108 A * | 10/1973 | Arneson | B65D 5/2023 | 229/106 |
| 3,800,954 A * | 4/1974 | Lampcov | A47J 31/08 | 210/497.2 |
| 4,214,673 A | 7/1980 | Heath et al. | | |
| 4,453,649 A * | 6/1984 | Origuchi | B65D 83/0811 | 206/554 |
| 4,592,840 A * | 6/1986 | Brooks | A47J 31/08 | 206/494 |
| 4,595,502 A * | 6/1986 | Himmelsbach | A47J 31/08 | 206/499 |
| 4,619,830 A * | 10/1986 | Napier | A47J 31/06 | 206/0.5 |
| 4,629,092 A | 12/1986 | English | | |
| 4,674,635 A | 6/1987 | Huldin et al. | | |
| 4,696,744 A * | 9/1987 | Sedlacek | A47J 31/08 | 210/387 |
| 4,971,222 A | 11/1990 | Rohde et al. | | |
| 5,067,627 A | 11/1991 | Anderson | | |
| 5,097,984 A | 3/1992 | Meisner et al. | | |
| D363,181 S | 10/1995 | Leviness | | |
| 5,671,865 A | 9/1997 | Sarris | | |
| 6,116,459 A | 9/2000 | Wilson | | |
| 6,131,764 A | 10/2000 | Norman | | |
| 6,170,697 B1 | 1/2001 | Sarris | | |
| 6,358,290 B1 * | 3/2002 | Huttlin | B01D 46/0067 | 210/493.1 |
| 6,478,188 B1 | 11/2002 | Fay | | |
| 7,334,579 B2 | 2/2008 | Tayebi | | |
| D618,501 S | 6/2010 | Billot et al. | | |
| 2004/0211424 A1 * | 10/2004 | Tayebi | A62B 23/02 | 128/205.27 |
| 2008/0271738 A1 * | 11/2008 | Tayebi | A62B 23/02 | 128/205.29 |
| 2011/0114782 A1 * | 5/2011 | Rodrian | A47K 10/36 | 242/563 |
| 2011/0248493 A1 * | 10/2011 | Aronstein | B42D 15/08 | 283/116 |

OTHER PUBLICATIONS

Coffee Filter Holder Reviews, Ultimate Coffees Info Website, Web page <http://www.ultimate-coffees-info.com/coffee-filter-dispenser.html>, 3 pages, dated Oct. 28, 2011, retrieved from Internet Archive Wayback Machine <https://web.archive.org/web/20111028140928/http://www.ultimate-coffees-info.com/coffee-filter-holder.html> on Jul. 4, 2014.

Coffee Filters, Cappo Jim's Website, Web page <http://www.cappojim.com/coffee-filters-c-10.html>, 2 pages, dated Sep. 3, 2011, retrieved from Internet Archive Wayback Machine <https://web.archive.org/web/20110903171733/http://www.cappojim.com/coffee-filters-c-10.html> on Jul. 4, 2014.

Coffee Filter Dispenser on New Products Page, A-Z RV Products Website, Web page <http://www.azrvproducts.com/newproductsnoprices.htm>, 9 pages, dated Mar. 21, 2012, retrieved from Internet Archive Wayback Machine <https://web.archive.org/web/20120321012734/http://www.azrvproducts.com/newproductsnoprices.htm> on Jul. 4, 2014.

Oggi 7088 Airtight Stainless Steel 16 oz. Coffee Canister, Beverage Factory.com Website, Web page <http://www.beveragefactory.com/coffee/accessories/oggi_7088_airtight_coffee_bean_canister.shtml>, 2 pages, dated May 23, 2011, retrieved from Internet Archive Wayback Machine <https://web.archive.org/web/20110523110556/http://www.beveragefactory.com/coffee/accessories/oggi_7088_airtight_coffee_bean_canister_.shtml> on Jul. 4, 2014.

* cited by examiner

Detail "A"

COFFEE FILTER ROLL, COFFEE FILTER DISPENSING SYSTEM, AND A METHOD OF DISPENSING ROLLED COFFEE FILTERS

CROSS-REFERENCE TO RELATED APPLICATIONS

This patent application claims priority to, and incorporates by reference in its entirety, U.S. Provisional Patent Application No. 61/761,958, entitled "EZ Coffee Filter", filed on Feb. 7, 2013.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to coffee filters. More particularly, the invention relates to coffee filters that are in a roll configuration, a system for dispensing rolled filters, and a method of dispensing rolled coffee filters.

2. Background and Description of Related Art

Traditional coffee filters are sold in stacks or sleeves, making them difficult to separate when making coffee. People may accidently use two or three filters at one time, which can be wasteful and can cause water to flow over the sides of a coffeepot and make a mess. Filters are also packaged in plastic, which can be difficult to open, especially for elderly people or people with disabilities. Additionally, filters are typically stored unprotected in a cabinet or drawer, which can be unsanitary.

Therefore, what is needed is a coffee filter roll and coffee filter dispensing system using the same that provides people with quick and convenient access to coffee filters, and ensures only one filter is used at a time. Moreover, a coffee filter roll and coffee filter dispensing system is needed that protects the coffee filters from contaminants while stored away, and reduces the overall amount of time it takes to make coffee. Furthermore, there is a need for a coffee filter roll and coffee filter dispensing system that is ideal for use in both residential and commercial settings. There is also a need for a method of dispensing rolled coffee filters that has the abovementioned attributes.

BRIEF SUMMARY OF EMBODIMENTS OF THE INVENTION

Accordingly, the present invention is directed to a coffee filter roll, a coffee filter dispensing system, and a method of dispensing rolled coffee filters that substantially obviates one or more problems resulting from the limitations and deficiencies of the related art.

In accordance with one or more embodiments of the present invention, there is provided a coffee filter roll that includes: a plurality of coffee filters successively arranged in a roll configuration, each of the plurality of coffee filters being detachably coupled to one another, and each of the plurality of coffee filters including a plurality of fold lines configured to facilitate an insertion of each of the plurality of coffee filters into a coffee filter basket of a coffee maker; and a plurality of lines of weakness, each of the plurality of lines of weakness being disposed between adjacent coffee filters in the coffee filter roll. In these one or more embodiments, each of the plurality of coffee filters is configured to be separated from the coffee filter roll by tearing the coffee filter being removed from the adjacent coffee filter in the coffee filter roll along at least one of the plurality of lines of weakness.

In a further embodiment of the present invention, each of the plurality of coffee filters is generally octagonal in shape with a plurality of octagonal sides, and each interior one of the plurality of coffee filters comprises the lines of weakness on opposed octagonal sides thereof.

In yet a further embodiment, the octagonal sides of each of the plurality of coffee filters are spaced apart from one another by substantially V-shaped notches.

In still a further embodiment, the plurality of fold lines on each of the plurality of coffee filters is arranged in a plurality of generally V-shaped sectors, each of the plurality of generally V-shaped sectors being circumferentially spaced apart from one another about a circumference of the coffee filter.

In yet a further embodiment, each of the plurality of generally V-shaped sectors comprises a plurality of inner fold lines bounded by a pair of outer fold lines.

In still a further embodiment, the plurality of fold lines on each of the plurality of coffee filters include a circular fold line centrally located on each coffee filter, and wherein each of the plurality of generally V-shaped sectors comprises a tip located proximate to the circular fold line.

In yet a further embodiment, each of the plurality of fold lines on each of the plurality of coffee filters comprises a plurality of micro-perforations.

In still a further embodiment, each of the plurality of lines of weakness comprises a plurality of spaced apart elongate perforations.

In yet a further embodiment, the plurality of fold lines on each of the plurality of coffee filters includes radially extending fold lines that are generally equally spaced apart from one another about a circumference of the coffee filter.

In still a further embodiment, the plurality of fold lines on each of the plurality of coffee filters further includes an outer circular fold line centrally located on each coffee filter, and wherein each of the radially extending fold lines extends approximately from the outer circular fold line to an outer peripheral edge of the coffee filter.

In yet a further embodiment, the plurality of fold lines on each of the plurality of coffee filters further includes an inner circular fold line centrally located on each coffee filter, the inner circular fold line disposed inside of the outer circular fold line.

In still a further embodiment, the plurality of fold lines on each of the plurality of coffee filters further includes a middle fold line bisecting each coffee filter into two substantially equal halves.

In yet a further embodiment, a filter media forming the coffee filter roll comprises a single-ply material.

In accordance with one or more other embodiments of the present invention, there is provided a coffee filter dispensing system that includes: (i) a coffee filter roll comprising a plurality of coffee filters successively arranged in a roll configuration, each of the plurality of coffee filters being detachably coupled to one another, and each of the plurality of coffee filters including a plurality of fold lines configured to facilitate an insertion of each of the plurality of coffee filters into a coffee filter basket of a coffee maker; and a plurality of lines of weakness, each of the plurality of lines of weakness being disposed between adjacent coffee filters in the coffee filter roll; and (ii) a dispenser housing substantially enclosing the coffee filter roll, the dispenser housing including an elongated aperture for allowing the passage of unrolled ones of the plurality of coffee filters therethrough. In these one or more embodiments, each of the plurality of coffee filters is configured to be separated from the coffee filter roll by tearing the coffee filter being removed from the adjacent coffee filter in the coffee filter roll along at least one of the plurality of lines of weakness.

In a further embodiment of the present invention, the dispenser system is in the form of a manual dispenser, and wherein the coffee filter roll is configured to be manually unrolled by a user thereof.

In yet a further embodiment, the dispenser system is in the form of an automatic dispenser, and wherein the coffee filter roll is configured to be automatically unrolled by an actuator disposed inside the dispensing housing.

In still a further embodiment, the automatic dispenser comprises a sensor device for detecting a presence of a user, the sensor device being operatively coupled to the actuator so that the coffee filter roll is capable of being automatically advanced when the presence of the user is detected by the sensor device.

In yet a further embodiment, the dispenser housing comprises attachment means for coupling the dispenser housing to a structure in a room.

In accordance with yet one or more other embodiments of the present invention, there is provided a method of dispensing rolled coffee filters that includes the steps of: (i) providing a coffee filter roll comprising a plurality of coffee filters successively arranged in a roll configuration, each of the plurality of coffee filters being detachably coupled to one another, and each of the plurality of coffee filters including a plurality of fold lines configured to facilitate an insertion of each of the plurality of coffee filters into a coffee filter basket of a coffee maker; and a plurality of lines of weakness, each of the plurality of lines of weakness being disposed between adjacent coffee filters in the coffee filter roll; (ii) advancing the coffee filter roll such that at least a portion of one of the plurality of coffee filters becomes unrolled from the coffee filter roll; and (iii) separating the one of the plurality of coffee filters from a remainder of the coffee filter roll by tearing the coffee filter being removed from the adjacent coffee filter in the coffee filter roll along at least one of the plurality of lines of weakness.

In a further embodiment of the present invention, the method further comprises the step of providing a dispenser housing that substantially encloses the coffee filter roll, the dispenser housing including an elongated aperture for allowing the passage of unrolled ones of the plurality of coffee filters therethrough. Also, in this further embodiment, the step of advancing the coffee filter roll comprises advancing the coffee filter roll such that at least a portion of the one of the plurality of coffee filters passes through the elongated aperture of the dispenser housing and is exposed outside the dispenser housing.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 3:
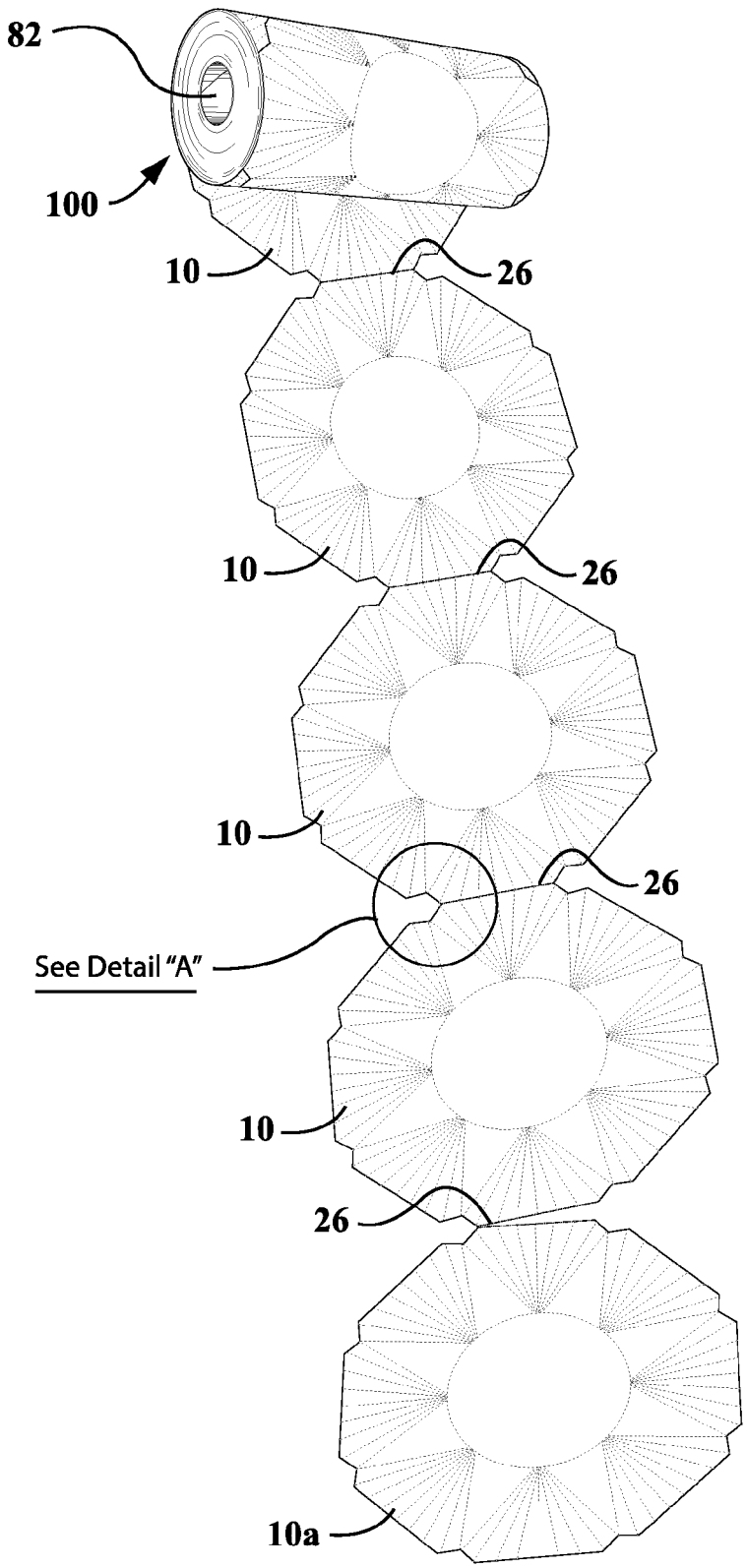
FIG. 3 is a perspective view of a partially unrolled coffee filter roll illustrating the manner in which a plurality of coffee filters, like the one depicted in FIG. 1, are detachably connected to one another.
Figure 4:
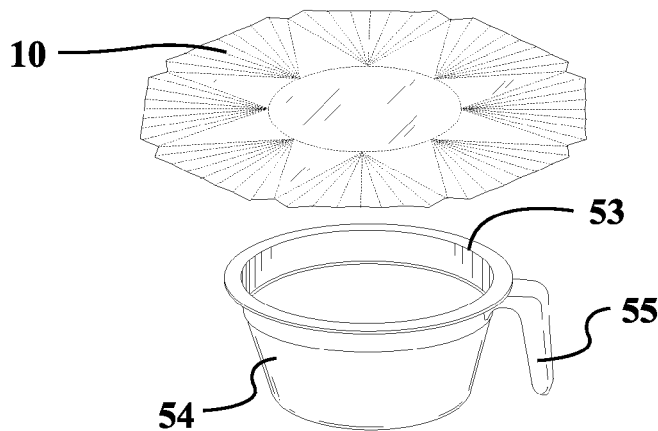
FIG. 4 illustrates a first stage of the process by which the coffee filter of FIG. 1 is inserted into a residential-type coffee filter basket.
Figure 5:
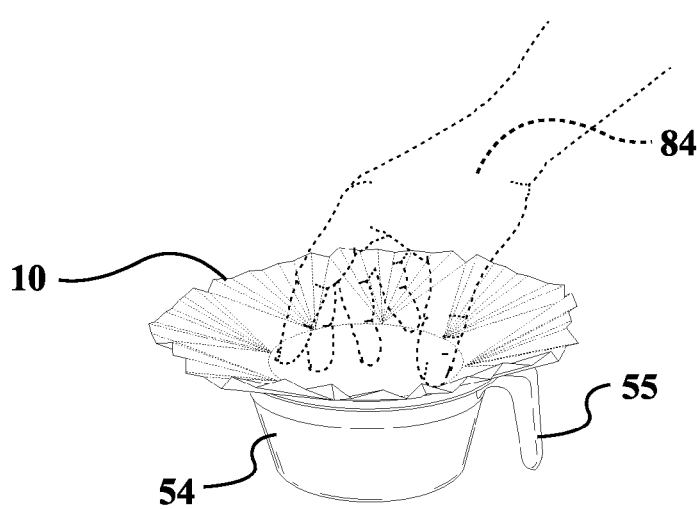
FIG. 5 illustrates a second stage of the process by which the coffee filter of FIG. 1 is inserted into a residential-type coffee filter basket.

An exemplary embodiment of an inventive coffee filter roll is seen generally at 100 in FIG. 3. As shown in the perspective view of FIG. 3, the coffee filter roll 100 generally comprises a plurality of coffee filters 10 successively arranged in a roll configuration, each of the plurality of coffee filters 10 being detachably coupled to one another, and each of the plurality of coffee filters 10 including a plurality of fold lines configured to facilitate an insertion of each of the plurality of coffee filters 10 into a coffee filter basket of a coffee maker; and a plurality of lines of weakness 26, each of the plurality of lines of weakness 26 being disposed between adjacent the coffee filters 10 in the coffee filter roll 100. Each of the plurality of coffee filters 10 in FIG. 3 is configured to be separated from the coffee filter roll 100 by tearing the coffee filter 10 being removed from the adjacent coffee filter 10 in the coffee filter roll 100 along at least one of the plurality of lines of weakness 26. For example, as illustrated in FIG. 3, the coffee filter 10a at the end of the roll 100 is being separated from the coffee filter 10 thereabove along the line of weakness 26 (i.e., the coffee filter 10a is shown partially severed from the coffee filter roll 100 in FIG. 3 to illustrate an exemplary manner in which a coffee filter 10 may be removed from the roll 100). In the illustrated embodiment of FIG. 3, it can be seen the coffee filters 10 are rolled around a center cardboard tube 82, which adds to the overall rigidity of the coffee filter roll 100. In one or more embodiments, the coffee filters 10 that are rolled in close proximity to the center cardboard tube 82 (which will be dispensed when the roll is about finished) are provided with colored edges (e.g., pink edges) or a numbered countdown in order to signify that the roll 100 needs replaced soon.

Referring again to FIG. 3, it can be seen that each of the plurality of coffee filters 10 in the roll 100 is generally octagonal in shape with a plurality of octagonal sides. Also, each interior one of the plurality of coffee filters 10 comprises the lines of weakness 26 on opposed octagonal sides thereof. In one or more embodiments, each line of weakness 26 comprises a plurality of spaced apart elongate perforations (i.e., elongate slits) that allow the coffee filter disposed at the end of the roll 100 (e.g., coffee filter 10a in FIG. 3) to be easily separated from the remainder of the roll 100. For example, the lines of weakness 26 may comprise ¼" long slits spaced apart by ¼" between slits, ⅛" long slits spaced apart by ⅛", ¹⁄₁₆" long slits spaced apart by ¹⁄₁₆", ¹⁄₃₂" long slits spaced apart by ¹⁄₃₂", etc.

Figure 1:
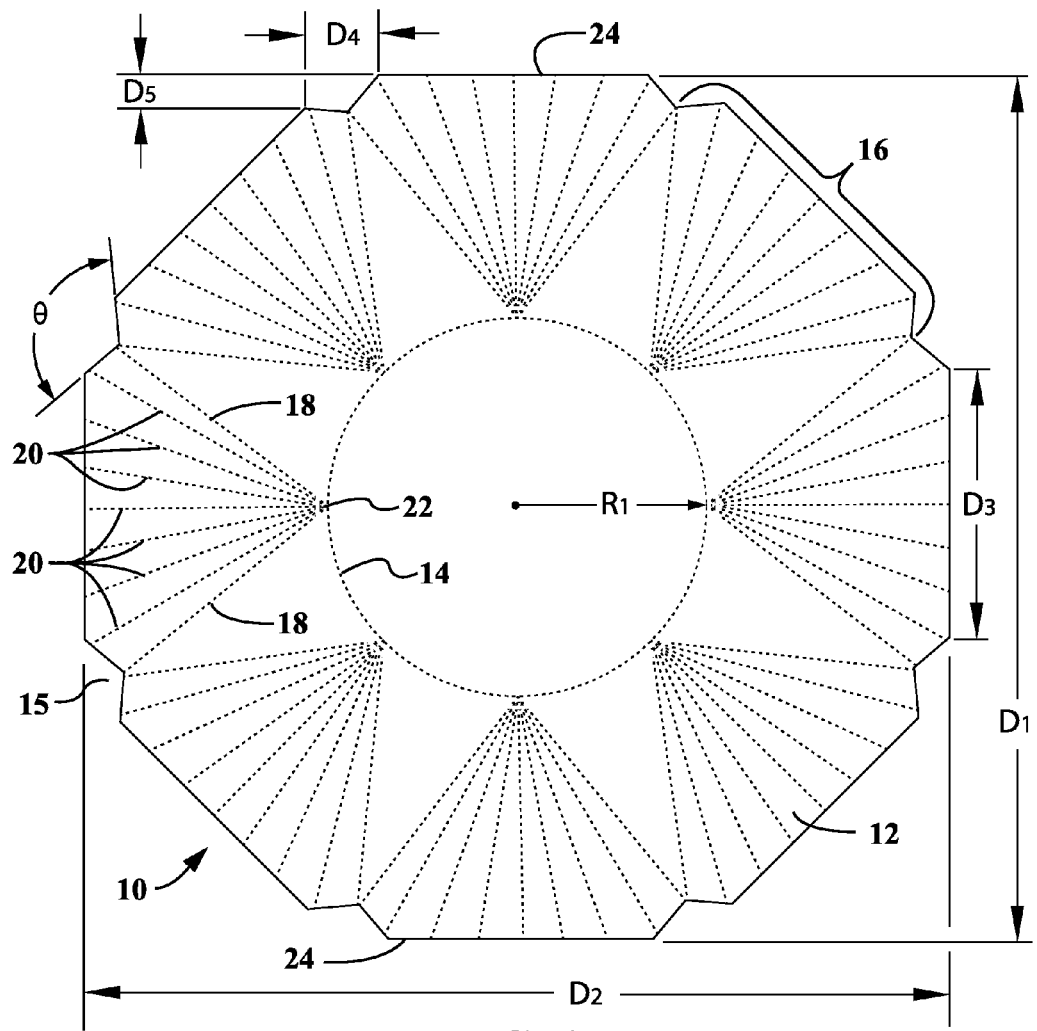
FIG. 1 is a top view of a first type of coffee filter dispensed on a coffee filter roll, according to an embodiment of the invention, wherein the coffee filter is illustrated in a flat, unfolded state.
Figure 2:
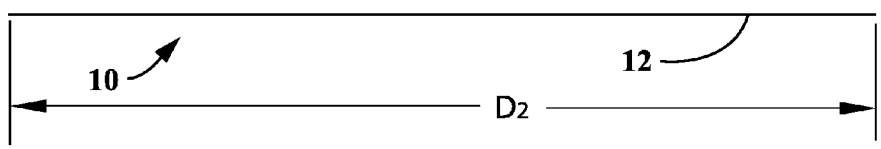
FIG. 2 is a side view of the coffee filter of FIG. 1.

Now, turning to FIGS. 1 and 2, the structural features of a first exemplary embodiment of a coffee filter, which is utilized on the roll 100 of FIG. 3, will be described in detail. The coffee filter 10 of FIGS. 1 and 2 is primarily designed for use as a basket-type coffee filter, but can also be used as a cone-style coffee filter. Initially, as shown in the top view of FIG. 1, it can be seen that the coffee filter 10 comprises a generally octagonal coffee filter body 12 with eight (8) octagonal sides. The octagonal sides of the coffee filter 10 are spaced apart from one another by substantially V-shaped notches 15 (i.e., wide V-shaped notches 15). Also, it can be seen in FIG. 1 that the coffee filter 10 has a plurality of radially extending fold lines 18, 20 that are grouped together in a plurality of generally V-shaped sectors 16 (i.e., eight (8) generally V-shaped sectors 16). Each of the plurality of generally V-shaped sectors 16 is circumferentially spaced apart from one another about a circumference of the coffee filter 10 (i.e., the generally V-shaped sectors 16 are substantially equally spaced apart from one another about the circumference of the coffee filter 10 so as to create an eight-pointed star shape in the middle of the filter 10—see FIG. 1). Each generally V-shaped sector 16 comprises a plurality of inner fold lines 20 bounded by a pair of outer fold lines 18. In addition, the octagonal coffee filter body 12 also includes a circular fold line 14 centrally located on the coffee filter 10. As depicted in FIG. 1, the outer and inner fold lines 18, 20 of each V-shaped sector 16 inwardly converge to a respective tip 22 located proximate to the circular fold line 14 (i.e., substantially disposed on the circular fold line 14). In one or more embodiments, each of the fold lines 14, 18, 20 comprises a line of weakness formed by a plurality of perforations or micro-perforations in the filter substrate or filter media material. The lines of weakness formed by the perforations or micro-perforations allow the coffee filter 10 to be easily inserted into a filter basket (e.g., filter basket 54 in FIGS. 4-7), as will be described hereinafter. For example, the lines of weakness may comprise a custom perforation pattern or a micro-perforation of 70 (i.e., a micro-perforation of 70 teeth per inch).

Referring again to FIG. 1, it can be seen that the generally octagonal coffee filter body 12 of the coffee filter 10 comprises tear edges 24 on opposed sides thereof. These tear edges 24 correspond to the lines of weakness or tear perforations 26 described above in conjunction with the coffee filter roll 100 of FIG. 3. That is, each coffee filter 10 is separated from the other coffee filters 10 on the roll 100 by using the tear perforations 26 along the tear edge 24 of the coffee filter 10.

Figure 10:
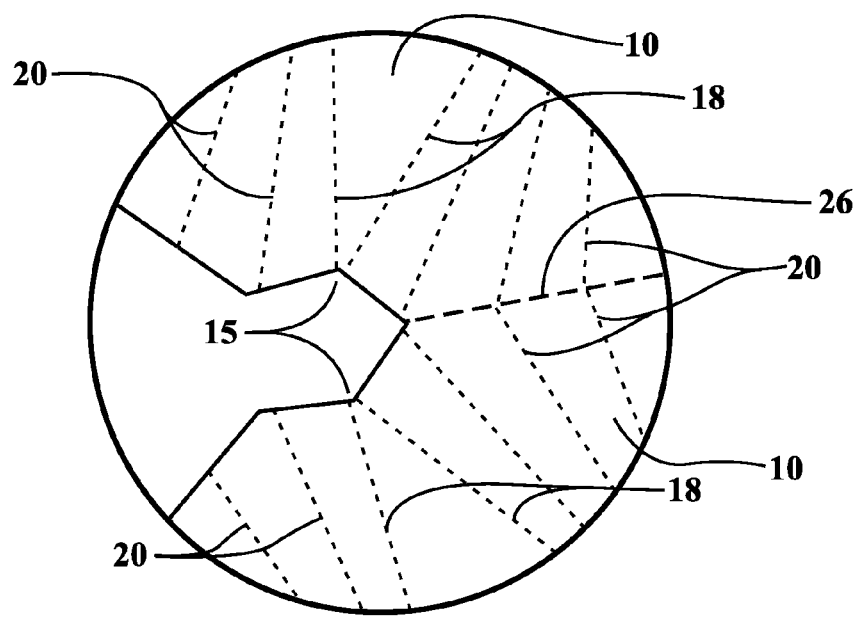
FIG. 10 is a partial enlarged view of the filter notches and the perforation line between two adjacent coffee filters on the coffee filter roll of FIG. 3 (Detail "A")

In FIG. 10, an enlarged, detailed view of the filter notches 15, the tear perforations 26, and the lines of weakness 18, 20 (fold lines) for two adjacent coffee filters on the coffee filter roll 100 of FIG. 3 are illustrated. As shown in FIG. 10, the elongate slit perforations that form the tear perforations 26 between adjacent coffee filters 10 on the roll 100 are substantially larger in size than the micro-perforations that form the fold lines 18, 20 of each coffee filter 10. As such, the tear perforations 26 allow the coffee filters 10 disposed on the roll 100 to be easily separated from one another when a user pulls on the endmost one 10a of the filters 10 in the roll 100 (see e.g., FIG. 3). The micro-perforations, which form the fold lines 18, 20 of each coffee filter 10, are designed to be sufficiently small so as to prevent coffee grounds from inadvertently passing through the filter 10.

Figure 6:
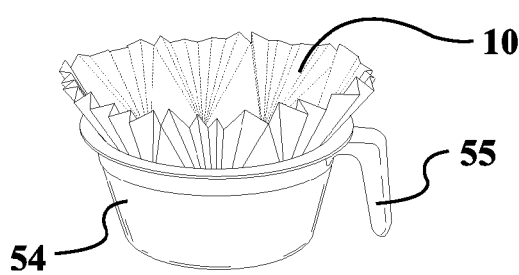
FIG. 6 illustrates a third stage of the process by which the coffee filter of FIG. 1 is inserted into a residential-type coffee filter basket.
Figure 7:
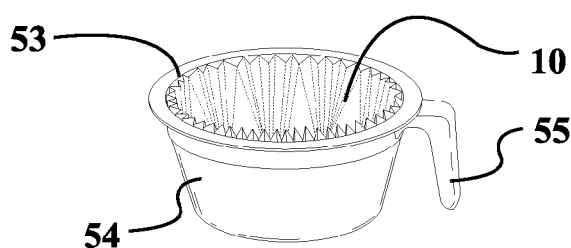
FIG. 7 illustrates a fourth stage of the process by which the coffee filter of FIG. 1 is inserted into a residential-type coffee filter basket.
Figure 8:
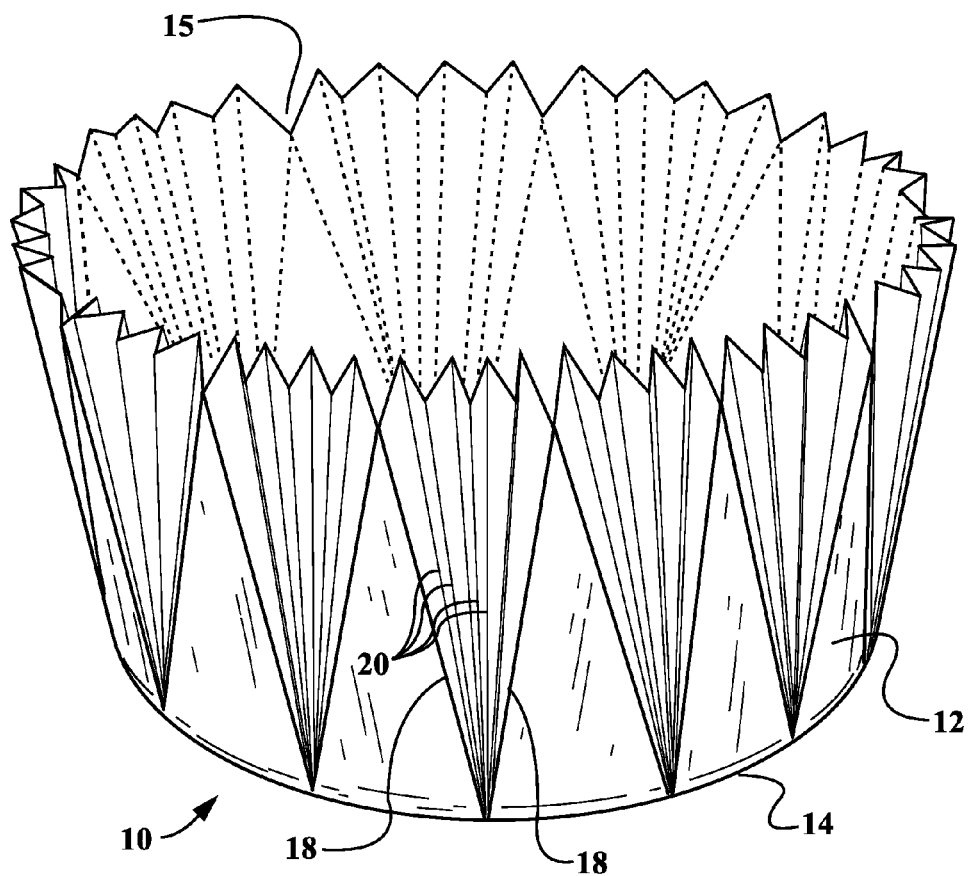
FIG. 8 is a perspective view of the coffee filter of FIG. 1, wherein the coffee filter is illustrated in a folded state.
Figure 9:
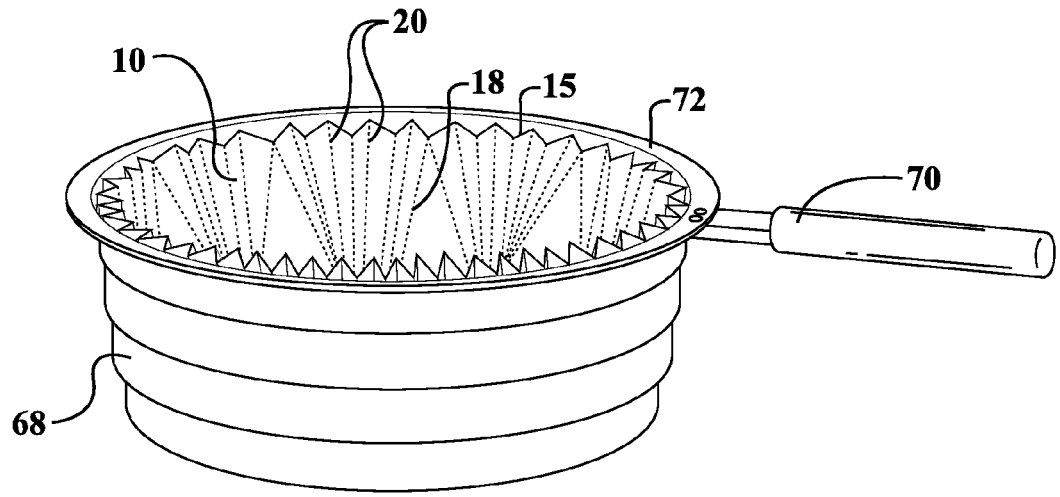
FIG. 9 is a perspective view of the coffee filter of FIG. 1 disposed in a commercial-type filter basket.

In FIG. 8, the coffee filter 10 is illustrated in a folded state. As shown in this figure, the fold lines 18, 20 on the side of the folded coffee filter 10 form pleats or crepes that enable the filter to generally conform to the geometry of a basket-style coffee filter basket (e.g., basket 54, as shown in FIGS. 4-7, or basket 68, as depicted in FIG. 9). The bottom circular fold line 14 generally conforms to the periphery of the circular bottom wall of the basket-style coffee filter basket.

In an exemplary embodiment, with reference to the top view of FIG. 1, the coffee filter 10 has a first overall dimension $D_1$ of approximately 8.0 inches and a second overall dimension $D_2$ of approximately 8.0 inches. Also, in the exemplary embodiment, the coffee filter 10 has an octagonal side width dimension $D_3$ of approximately 2.5 inches, a first notch dimension $D_4$ of approximately nine thirty-seconds (⁹⁄₃₂) of an inch, and a second notch dimension $D_5$ of approximately twenty-one sixty-fourths (²¹⁄₆₄) of an inch. The two sides of each substantially V-shaped notch 15 form an angle θ of approximately 125 degrees in the exemplary embodiment of the invention. Also, in the exemplary embodiment, the circular fold line 14 has a radius $R_1$ of approximately 1.75 inches. Although, it is to be understood that the coffee filter 10 is in no way limited to these particular dimensions. Rather, other suitable dimensions may be used for the coffee filter 10 without departing from the spirit of the invention.

Now, referring to FIGS. 4-7, an exemplary process by which the coffee filter 10 is inserted into a filter basket 54 of a residential-type coffee maker will be explained. The residential-type filter basket 54 includes a handle 55 for allowing a user to easily grasp the filter basket 54. Initially, after generally aligning the coffee filter 10 above the filter basket 54 (see FIG. 4), a hand 84 of a user begins to insert the coffee filter 10 into the top of the filter basket 54 (as shown in FIG.

5), whereby the rim 53 of the filter basket 54 deforms the coffee filter 10 as a result of the fold lines 14, 18, 20 (e.g., micro-perforations) in the coffee filter body 12. In FIG. 6, the coffee filter 10 has been inserted approximately halfway into the filter basket 54 by the hand 84 of the user such that the coffee filter 10 has assumed its substantially folded position, wherein the filter media contains a plurality of generally non-uniform pleats formed by the sector fold lines 18, 20. The circular fold line 14 is designed to substantially correspond to the circular bottom wall of the filter basket 54. Finally, as depicted in FIG. 7, the coffee filter 10 is completely pushed down into the filter basket 54 by the hand 84 of the user until the inner circular portion of the coffee filter 10, which is circumscribed by the circular fold line 14, generally contacts the top surface of the circular bottom wall of the filter basket 54. Once the coffee filter 10 has been fully inserted into the filter basket 54, the sector fold lines 18, 20 of the filter media form a plurality of generally uniform pleats, and the outer peripheral edge of the coffee filter 10 is substantially aligned with the top surface of the filter basket rim 53 (refer to FIG. 7).

The perspective view of FIG. 9 is similar to that of FIG. 7, except that the folded coffee filter 10 is disposed inside a commercial-type filter basket 68 (which is used with a commercial-type coffee maker), rather than in the residential-type filter basket 54 of FIGS. 4-7. Similar to the residential-type filter basket 54 described above, the commercial-type filter basket 68 includes a handle 70 and a rim 72. It is to be understood that the process described above in conjunction with FIGS. 4-7 is equally applicable to commercial-type filter basket 68 of FIG. 9. Also, as explained above for the residential-type filter basket 54, once the coffee filter 10 has been fully inserted into the commercial-type filter basket 68, the sector fold lines 18, 20 of the filter media form a plurality of generally uniform pleats, and the outer peripheral edge of the coffee filter 10 is substantially aligned with the top surface of the filter basket rim 72 (refer to FIG. 9).

Figure 11:
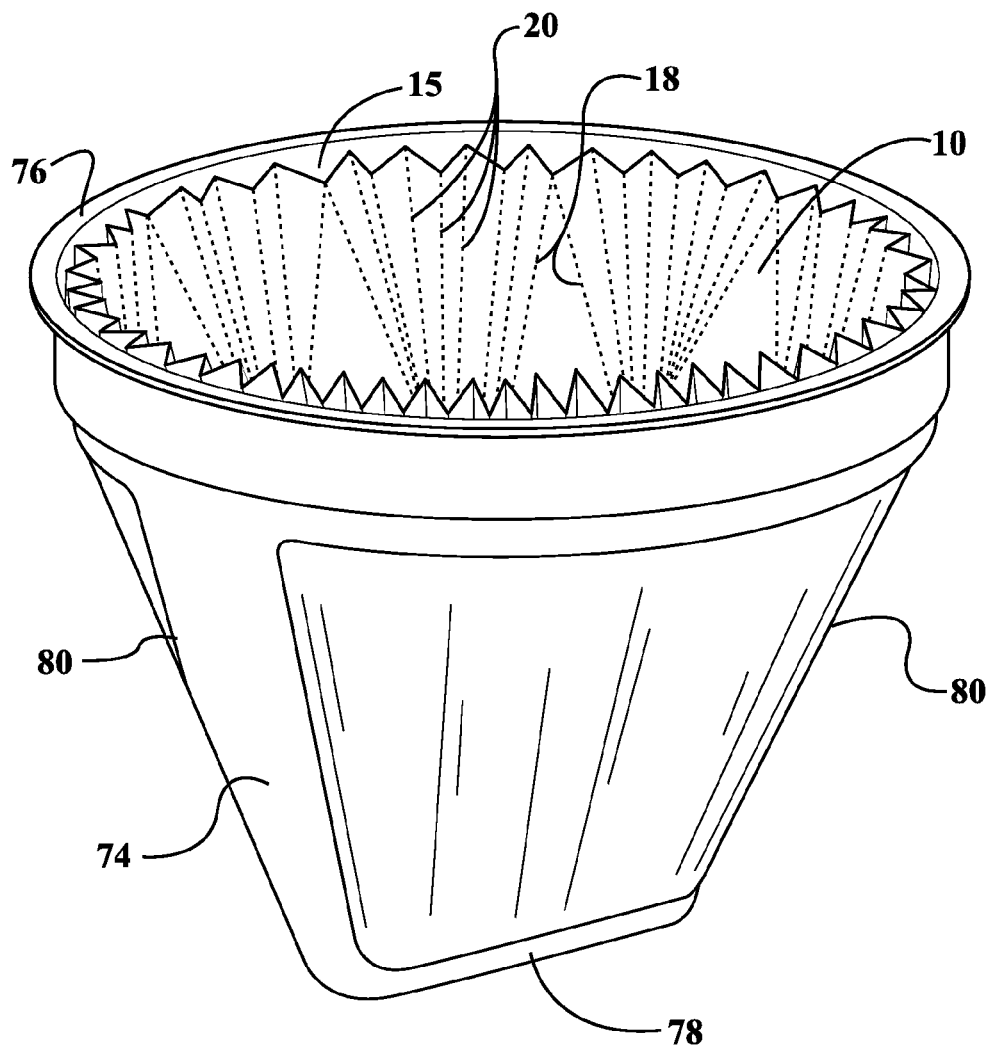
FIG. 11 is a perspective view of the coffee filter of FIG. 1 disposed in a cone-style filter basket.

The perspective view of FIG. 11 is similar to that of FIGS. 7 and 9, except that the folded coffee filter 10 is disposed inside a cone-shaped filter basket 74, rather than in the basket-shaped filter baskets 54, 68 of FIGS. 7 and 9. Similar to the basket-shaped filter baskets 54, 68 described above, the cone-shaped filter basket 74 includes a rim 76. It is to be understood that the process described above in conjunction with FIGS. 4-7 is equally applicable to cone-shaped filter basket 74. When the coffee filter 10 is used with a cone-shaped filter basket 74, the bottom wall of the filter 10, which is circumscribed by circular fold line 14, is simply pushed towards the tip 78 of the filter basket 74 until it generally deforms in accordance with the interior geometry of the cone-style filter basket 74. Also, as explained above for basket-shaped filter baskets 54, 68, once the coffee filter 10 has been fully inserted into the cone-shaped filter basket 74, the sector fold lines 18, 20 of the filter media form a plurality of generally uniform pleats, and the outer peripheral edge of the coffee filter 10 is substantially aligned with the top surface of the filter basket rim 76 (refer to FIG. 11).

Figure 12:
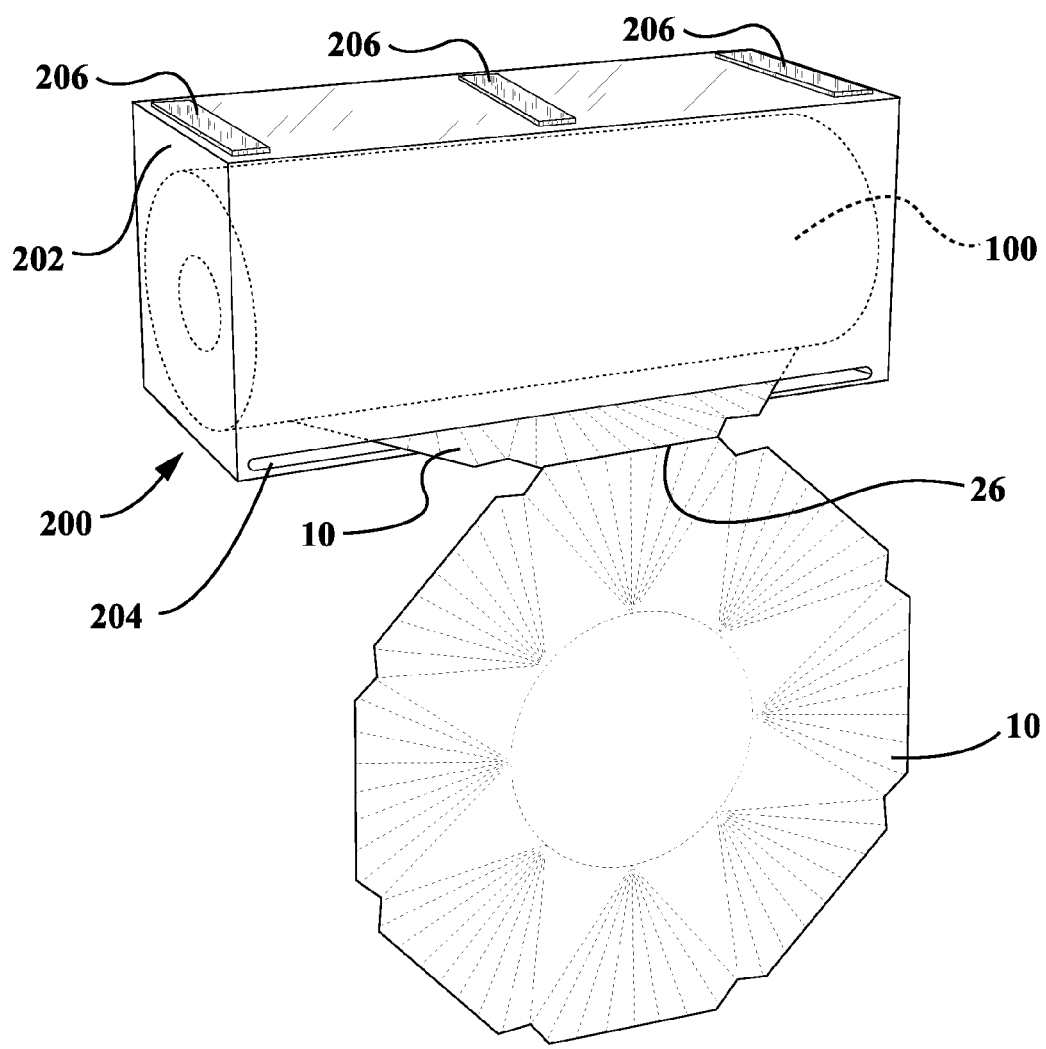
FIG. 12 is a perspective view of a first type of manual coffee filter dispensing system that utilizes a coffee filter roll, according to an embodiment of the invention.

In accordance with another aspect of one or more embodiments of the present invention, the coffee filter roll 100 described above may be used in conjunction with a coffee filter dispensing system. In addition to the coffee filter roll 100, the coffee filter dispensing system may further include a dispenser housing substantially enclosing the coffee filter roll 100. For example, as illustrated in FIG. 12, the dispenser system may be in the form of a manual coffee filter dispenser 200, wherein the coffee filter roll 100 is designed to be manually unrolled by a user thereof. In FIG. 12, it can be seen that the coffee filter roll 100 is contained within a dispensing housing in the form of a generally rectangular box 202 (i.e., the box 202 is generally in the form of a rectangular prism). The front of the box 202 includes an elongated aperture 204 (i.e., an elongated dispensing slot 204) for allowing the passage of one or more unrolled coffee filters 10 therethrough. As illustrated in FIG. 12, the width of the elongated dispensing slot 204 substantially corresponds to the width dimension of each coffee filter 10 (i.e., the elongated dispensing slot 204 is generally equal to the width dimension of each coffee filter 10, but with an added clearance on each side of the coffee filter (e.g., ⅛ inch on each side) so that the roll outer edges do not contact the opposed ends of the slot 204 and oppose the unrolling of the coffee filter roll 100. As additionally shown in FIG. 12, a surface of the box 202, which houses the coffee filter roll 100, may be provided with attachment means for attaching the dispenser box 202 to a structure in a room (e.g., the underside of kitchen cabinets, etc.). Specifically, in FIG. 12, the dispenser box 202 is provided with a plurality of adhesive strips 206 (e.g., three (3) adhesive strips 206) spaced apart along the top surface thereof for attaching the box 202 to a structure in a room, such as a cabinet, etc. For example, each of the adhesive strips 206 may comprise double-faced tape or another suitable type of adhesive means for removably securing the dispenser box 202 to a structure in the room. While the adhesive strips 206 are shown on the top surface of the box 202 in FIG. 12, it is to be understood that the adhesive strips 206 alternatively may be provided on other surfaces of the box 202 as well so as to accommodate a plurality of different mounting arrangements (e.g., on the bottom surface of the box 202 so that it may be adhered to a countertop or on one or more of the lateral surfaces of the box 202). Advantageously, the box 202 containing the coffee filter roll 100 can be stored in a drawer or cabinet, attached to the inside of a cabinet door, or mounted to the underside of a cabinet with the adhesive strips 206.

In exemplary embodiment, the box 202 has a length of approximately nine (9) inches and a cross-sectional area of approximately three (3) inches by three (3) inches. Although, it is to be understood that the box 202 is in no way limited to these particular dimensions, as the exact specifications may vary depending upon manufacturing. Other suitable dimensions may be used for the box 202 without departing from the spirit of the invention.

Figure 13:
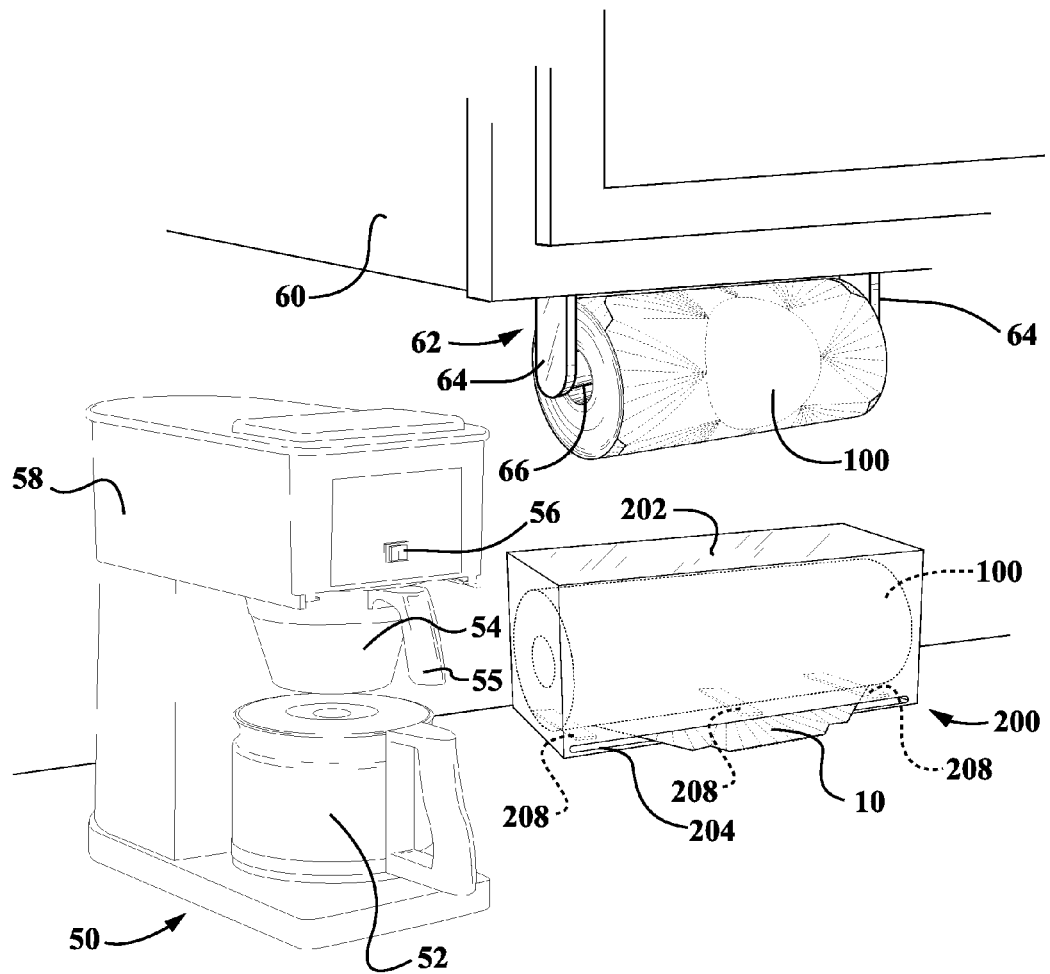
FIG. 13 is a perspective view of a second type of manual coffee filter dispensing system that utilizes a coffee filter roll shown together with the first type of manual coffee filter dispensing system, according to an embodiment of the invention, wherein the manual coffee filter dispensing systems are disposed adjacent to a coffee maker.

Another example of a manual-type coffee filter dispensing system is illustrated in FIG. 13. In this figure, it can be seen that the coffee filter roll 100 is supported by a hanging device 62 attached to the underside of a cabinet 60 (e.g., a kitchen cabinet or kitchenette cabinet). As shown in FIG. 13, the hanging device 62 comprises a generally cylindrical rod 66 for accommodating the coffee filter roll 100 thereon (i.e., the cylindrical rod 66 is inserted into the central circular aperture in the coffee filter roll 100 in a similar manner in which a paper towel roll is supported). The opposed ends of the generally cylindrical rod 66 of the hanging device 62 are supported by respective end brackets 64. The top surfaces of each end bracket 64 are attached to the bottom surface of the cabinet 60. In order to permit an empty coffee filter roll 100 to be removed and replaced with a new coffee filter roll 100, it is to be understood that one or more of the end brackets 64 may be detachably coupled to the rod 66 (e.g., one or more of the end brackets 64 may snap into engagement with the rod 66, and may be designed to pivot upwardly about a rotational axis disposed proximate to its cabinet securement location so that it is capable of swinging out of the way when a new coffee filter roll 100 is being placed on the rod 66). As further illustrated in FIG. 13, the coffee filter roll 100, which is rotatably supported on the hanging device 62, is conveniently placed in close proximity to a coffee maker 50, which utilizes the coffee filters 10 on roll 100. The coffee maker 50 generally comprises a carafe or pot 52 for containing brewed coffee therein, a filter basket 54 that receives one of the coffee filters 10 therein, an on-off switch 56 for activating the coffee maker 50, and a main body portion 58 that contains the primary components of the coffee maker 50. When it is necessary to change or add a new coffee filter 10 to the coffee maker 50, the filter basket 54 is designed to be slidingly removed from the remainder of the coffee maker 50 when a user pulls outwardly on the handle 55 of the filter basket 54.

Referring again to FIG. 13, it can be seen that a box 202 with a coffee filter roll 100 therein is disposed on the countertop next to the coffee maker 50. Like the manual coffee filter dispenser 200 described above in conjunction with FIG. 12, the coffee filter box 202 comprises an elongated dispensing slot 204 in the lower front side thereof for allowing the passage of one or more unrolled coffee filters 10 therethrough. Although, unlike the coffee filter dispenser 200 of FIG. 12, a plurality of adhesive strips 208 (e.g., three (3) adhesive strips 208) are located on the bottom surface of the box 202, rather than on the top surface of the box. In FIG. 13, the adhesive strips 208, which are located on the bottom surface of the box 202, allow the box to be removably attached to the top surface of the countertop so that coffee filters 10 may be easily dispensed, and torn from the roll 100, without the box 202 undesirably sliding along the countertop surface.

Figure 14:
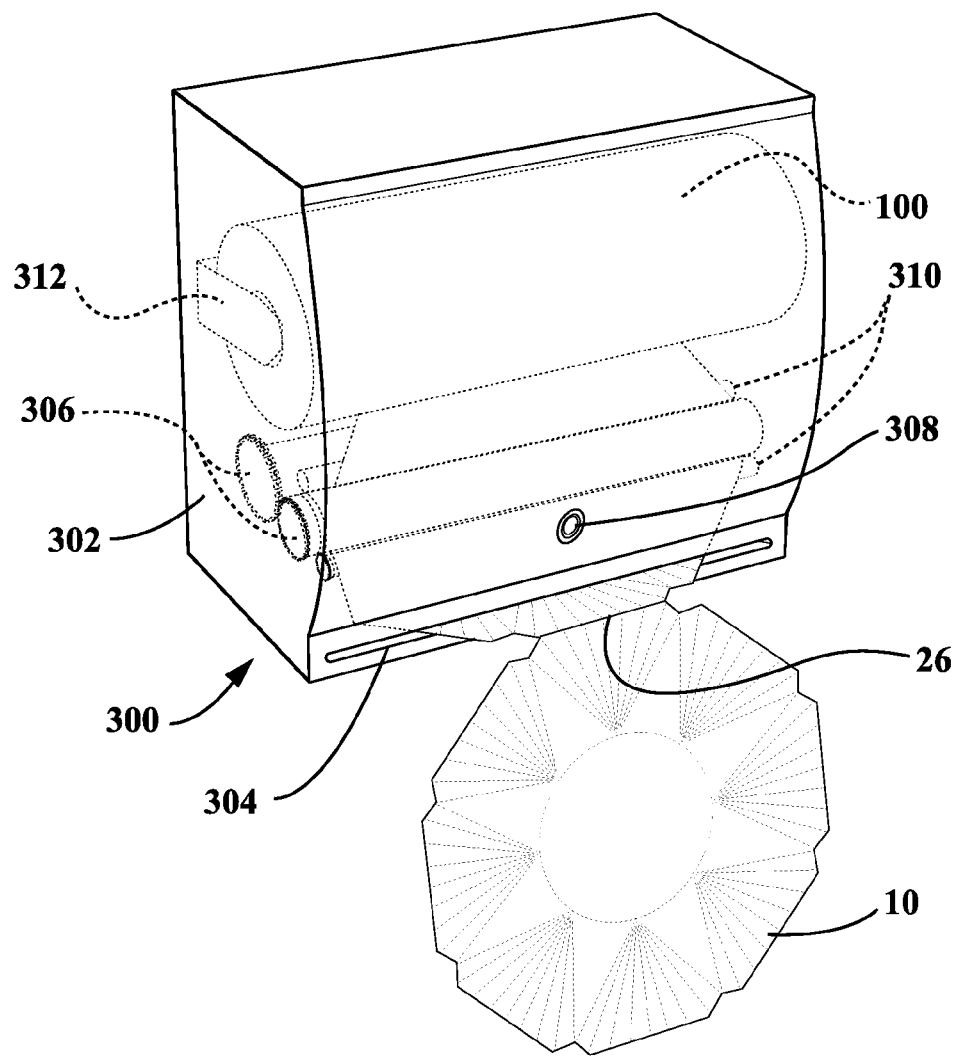
FIG. 14 is a perspective view of an automatic coffee filter dispensing system that utilizes a coffee filter roll, according to an embodiment of the invention.

As illustrated in FIG. 14, the dispenser system also may be in the form of an automatic coffee filter dispenser 300, wherein the coffee filter roll 100 is designed to be automatically unrolled by an actuator 306 disposed inside a dispensing housing 302. Similar to the manual dispensing box 202 described above, the front of the automatic dispenser housing 302 includes an elongated aperture 304 (i.e., an elongated dispensing slot 304) for allowing the passage of one or more unrolled coffee filters 10 therethrough. The coffee filter roll 100 is supported on a support bracket 312 inside the dispenser housing 302. The coffee filter roll 100 is rotatably coupled, and removably coupled to the support bracket 312 so that an empty coffee filter roll 100 is able to be removed, and replaced with a new coffee filter roll 100. In FIG. 14, it can be seen that the automatic dispenser system 300 further includes a sensor device 308 for detecting a presence of a user (e.g., for detecting the presence of a hand of a user proximate thereto). The sensor device 308 may comprise an infrared sensor, an ultrasonic sensor, or any other suitable sensor or combination of sensors. The sensor device 308 is operatively coupled to the actuator 306 so that the coffee filter roll 100 is capable of being automatically advanced when the presence of the user is detected by the sensor device 308 (i.e., when the hand of the user is located proximate to the sensor 308). When the presence of the user is detected by the sensor device 308 on the front of the dispenser housing 302, the coffee filter media on the coffee filter roll 100 is automatically advanced so that a coffee filter 10 is always accessible to a user. In particular, the coffee filter media is automatically advanced by the geared actuator rollers 306, which are operatively coupled to a motive device inside the housing 302, such as an electric motor. As shown in FIG. 14, the path of the coffee filter media inside the housing 302 is also regulated by the guide rollers 310. The coffee filter media is unrolled within the housing 302 by means of its generally sandwiched arrangement between at least one of the geared actuator rollers 306 and the guide rollers 310.

Figure 15:
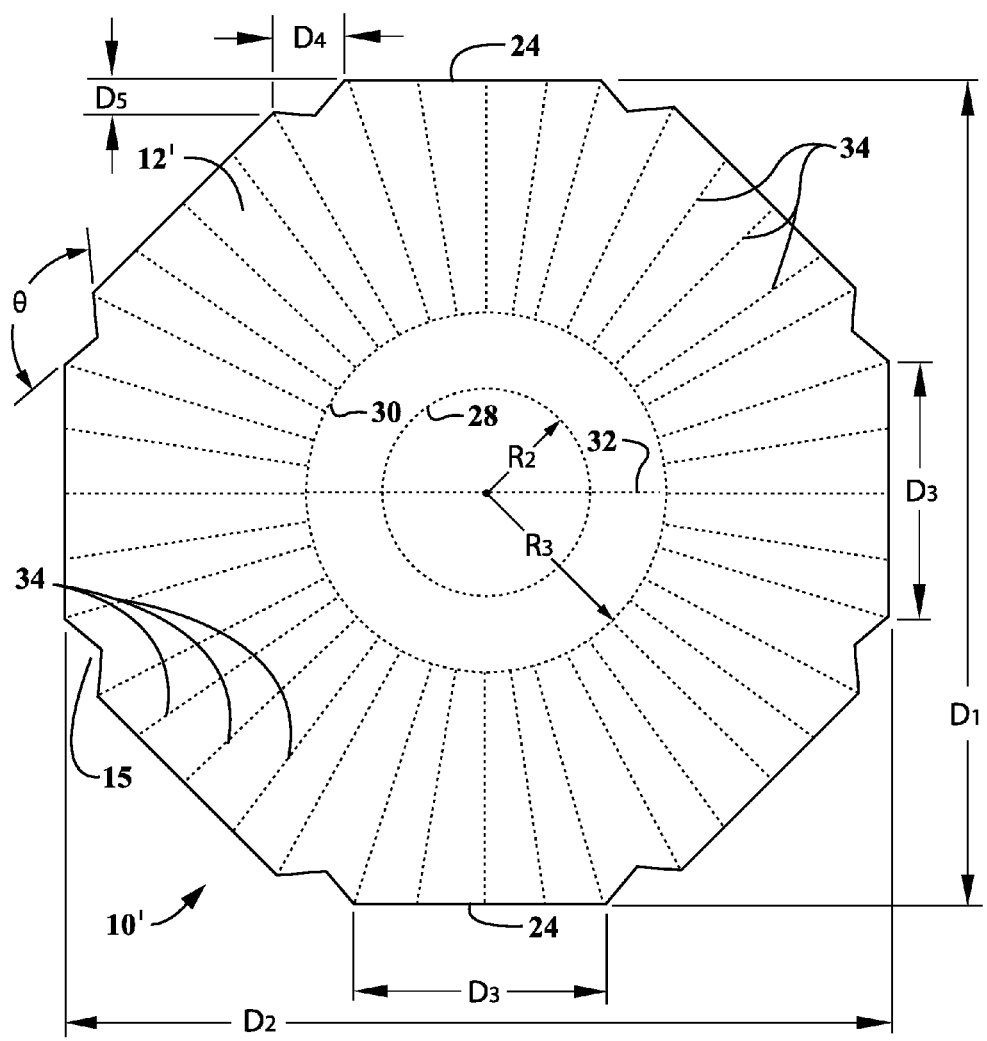
FIG. 15 is a top view of a second type of coffee filter dispensed on a coffee filter roll, according to an alternative embodiment of the invention, wherein the coffee filter is illustrated in a flat, unfolded state.
Figure 16:
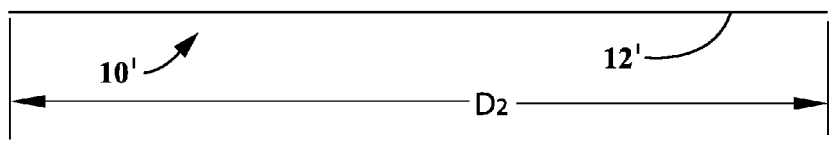
FIG. 16 is a side view of the coffee filter of FIG. 15.

Next, with reference to FIGS. 15 and 16, the structural features of a second exemplary embodiment of a coffee filter, which may be utilized on a coffee filter roll (e.g., on the coffee filter roll 100 of FIG. 3), will be explained in detail. Advantageously, the coffee filter 10' of FIGS. 15 and 16 can readily be used as both a basket-type coffee filter and a cone-type coffee filter. As illustrated in the top view of FIG. 15, similar to the coffee filter 10 described above, the coffee filter 10' comprises a generally octagonal coffee filter body 12' with eight (8) octagonal sides. Also, like the coffee filter 10, the octagonal sides of the coffee filter 10' are spaced apart from one another by substantially V-shaped notches 15. Although, unlike the coffee filter 10, the coffee filter 10' does not contain fold lines that are arranged together in sectors. Rather, the coffee filter 10' comprises a plurality of radially extending fold lines 34 that are generally equally spaced apart from one another about a circumference of the coffee filter 10'. Also, it can be seen in FIG. 15 that the coffee filter 10' has an inner circular fold line 28 centrally located on the coffee filter body 12' thereof. In addition, the coffee filter 10' further includes an outer circular fold line 30 disposed outside of the inner circular fold line 28 in a circumscribing relationship therewith. As shown in FIG. 15, the outer circular fold line 30 is generally concentric with the inner circular fold line 28. Each of the radially extending fold lines 34 extends approximately from the outer circular fold line 30 to the outer peripheral edge of the coffee filter 10'. The radially extending fold lines 34 are disposed generally perpendicular to the outer circular fold line 30. In addition, referring again to FIG. 15, it can be seen that the coffee filter body 12' of the coffee filter 10' also includes a middle fold line 32 extending the full width of the coffee filter 10', and bisecting the coffee filter 10' into two substantially equal halves. In particular, the middle fold line 32 of the coffee filter 10' facilitates the insertion of the coffee filter 10' into a cone-type filter basket of a coffee maker. In one or more embodiments, similar to that described above for the coffee filter 10, each of the fold lines 28, 30, 32, 34 of the coffee filter 10' comprises a line of weakness formed by a plurality of perforations or micro-perforations in the filter substrate or filter media material. For example, the lines of weakness may comprise a custom perforation pattern or a micro-perforation of 70 (i.e., a micro-perforation of 70 teeth per inch).

Figure 17:
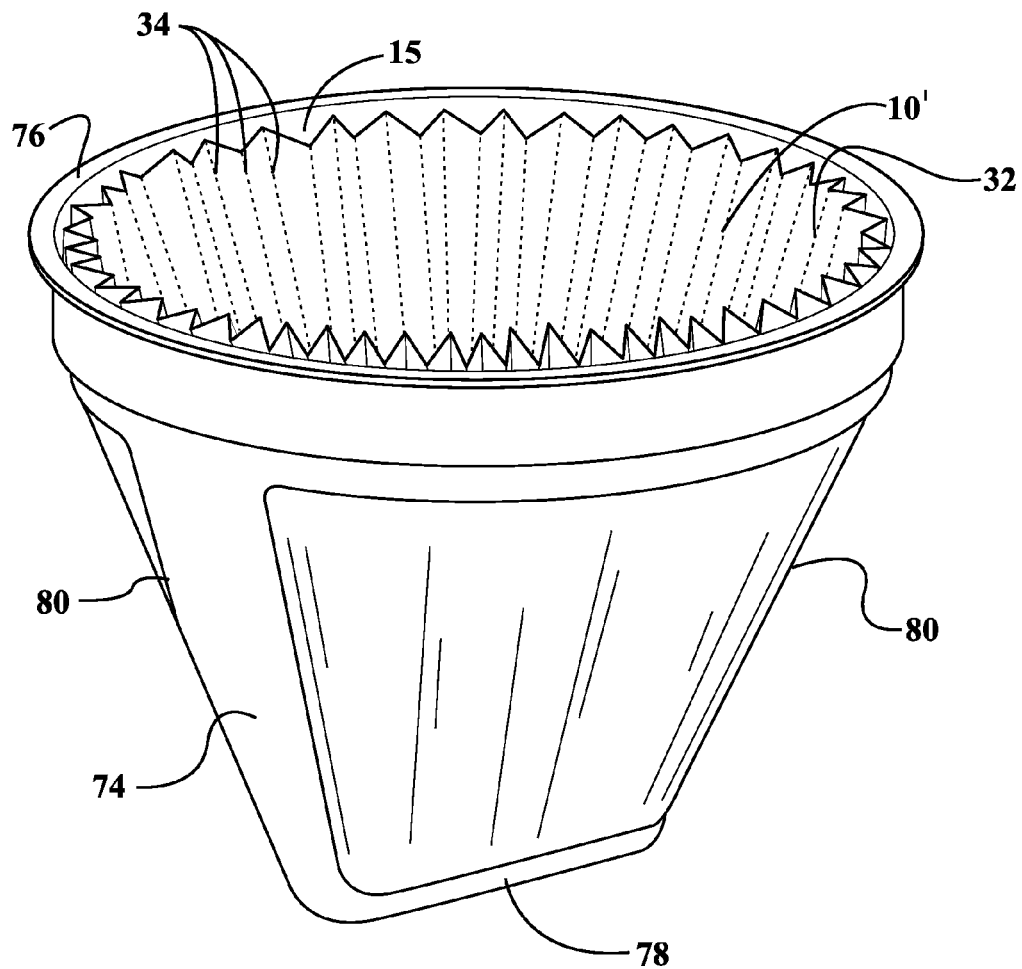
FIG. 17 is a perspective view of the coffee filter of FIG. 15 disposed in a cone-style filter basket.
Figure 18:
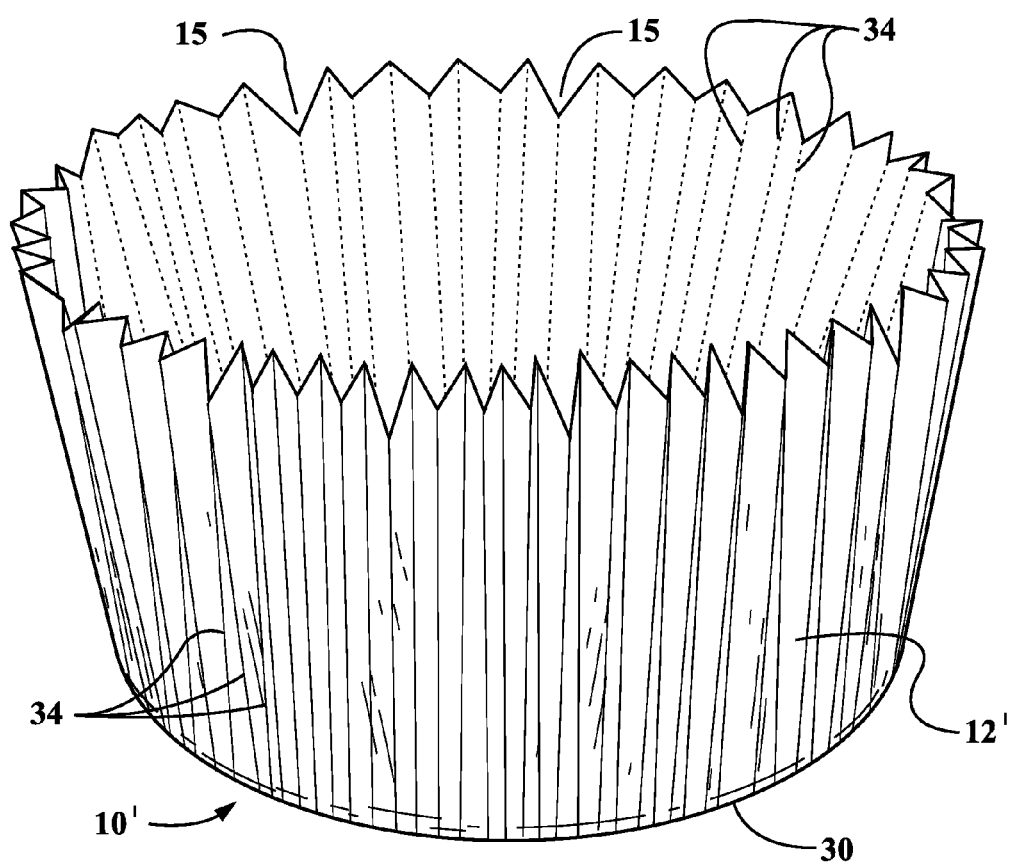
FIG. 18 is a perspective view of the coffee filter of FIG. 15, wherein the coffee filter is illustrated in a folded state.

In FIG. 18, the coffee filter 10' is illustrated in a folded state. As shown in this figure, the fold lines 34 on the side of the folded coffee filter 10 form pleats that enable the filter to generally conform to the geometry of either a basket-style coffee filter basket (e.g., basket 54, as shown in FIGS. 4-7, or basket 68, as depicted in FIG. 9) or a cone-style coffee filter basket (e.g., basket 74, as shown in FIGS. 11 and 17). The outer circular fold line 30 generally conforms to the periphery of the circular bottom wall of the basket-style coffee filter basket.

In an exemplary embodiment, with reference to the top view of FIG. 15, the coffee filter 10' has a first overall dimension $D_1$ of approximately 8.0 inches and a second overall dimension $D_2$ of approximately 8.0 inches. Also, in the exemplary embodiment, the coffee filter 10' has an octagonal side width dimension $D_3$ of approximately 2.5 inches, a first notch dimension $D_4$ of approximately nine thirty-seconds (9/32) of an inch, and a second notch dimension $D_5$ of approximately twenty-one sixty-fourths (21/64) of an inch. The two sides of each substantially V-shaped notch 15 form an angle $\theta$ of approximately 125 degrees in the exemplary embodiment of the invention. Also, in the exemplary embodiment, the inner circular fold line 28 has a radius $R_2$ of approximately 1.0 inches, while the outer circular fold line 30 has a radius $R_3$ of approximately 1.75 inches. Although, it is to be understood that the coffee filter 10' is in no way limited to these particular dimensions. Rather, other suitable dimensions may be used for the coffee filter 10' without departing from the spirit of the invention.

The perspective view of FIG. 17 is similar to that of FIG. 11, except that the coffee filter 10' of the second exemplary embodiment is disposed inside the cone-shaped filter basket 74, rather than the coffee filter 10 of the first exemplary embodiment. As described above, the cone-shaped filter basket 74 includes a rim 76 and a tip 78. It is to be understood that the process for inserting the coffee filter 10' into the cone-shaped filter basket 74 of FIG. 17 is essentially the same as the process described above in conjunction with FIGS. 4-7. However, unlike the coffee filter 10 that was described in connection with FIGS. 4-7 above, the coffee filter 10' includes the inner circular fold line 28 and the middle fold line 32, which render it particularly suitable for use in a cone-shaped filter basket, such as the basket 74 depicted in FIG. 17. When the coffee filter 10' is used with a cone-shaped filter basket 74, the generally concentric inner and outer circular fold lines 28, 30 generally conform to the conical geometry of the basket 74. Also, the middle fold line 32 of the coffee filter 10' generally conforms to the flattened-style tip 78 of the cone-shaped basket 74, as well as the opposed linear side portions 80 of the cone-shaped basket 74. That is, when the coffee filter 10' is in its folded-state in the cone-shaped basket 74, the middle fold line 32 of the coffee filter 10' is disposed along the interior of the flattened-style tip 78 and opposed linear side portions 80 (i.e., the middle fold line 32 is disposed within an imaginary plane bisecting the cone-shaped filter basket 74 in a longitudinal direction). Turning again to FIG. 17, similar to that explained above for the fold lines 18, 20 of the coffee filter 10, once the coffee filter 10' has been fully inserted into the cone-shaped filter basket 74, the radially extending fold lines 34 of the filter media form a plurality of generally uniform pleats, and the outer peripheral edge of the coffee filter 10' is substantially aligned with the top surface of the filter basket rim 76.

In one or more embodiments, the filter media forming the coffee filter roll 100, and the detachable coffee filters 10, 10' rolled therein, comprises a single-ply material. That is, the coffee filter roll 100 comprises a single, rolled layer of filter media, and each of the detachable coffee filters 10, 10' comprises a coffee filter that is completely flat when laid out in its unfolded state before being inserted into the filter basket. Unlike conventional cone-type coffee filters, the coffee filters 10, 10' do not comprise adjacent, substantially parallel, multiple layers of material that form a collapsed pocket in their unfolded state. Also, unlike conventional basket-type coffee filters, the coffee filters 10, 10' are not arranged in a stacked configuration when packaged. That is, each coffee filter 10, 10' is not stacked within another coffee filter in the packaged state. In one or more embodiments, the single-ply coffee filter media may comprise porous 17 pound (17#) paper with a density of approximately 64 grams per square meter (64 gsm), or 25 pound (25#) paper with a density of approximately 90 grams to 100 grams per square meter (between 90-100 gsm, inclusive). The single-ply coffee filter media may have moderate wet strength so that is does not easily tear when saturated with water after brewing the pot of coffee.

Also, in one or more embodiments, the coffee filter media may be impregnated with a flavor-producing substance that adds a particular flavor to the coffee as it passes through the coffee filters 10, 10' during the coffee brewing process. For example, the flavor-producing substance may comprise any flavor that is commonly used to flavor coffee, such as mocha, vanilla, French vanilla, caramel, cinnamon, Irish cream, cream and sugar, cappuccino, etc. Advantageously, when such a flavor-impregnated filter is used, the coffee will be automatically flavored during brewing process, thereby obviating the need to separately flavor the coffee after the brewing process.

In addition, in one or more embodiments, the coffee filter fold lines 14, 18, 20, 28, 32, 34 and tear perforations 26 are formed in the following manner. First, a continuous roll of filter material or filter media is fed between two rollers. The first roller (e.g., a top roller die or hard cylinder die) has a pattern of micro-perforation projections to form the fold lines of the filter, a pattern of slit-like projections to form the tear perforation lines 26 between filters, as well as edge cutting means to form the overall shape of the filters (e.g., octagonal shape). The second roller (e.g., a bottom roller) rotates at the same speed as the first roller die (e.g., a top roller die) and provides the firm backing/pressure that is required for the cutting die to cut into the filter media, and to form the fold lines 14, 18, 20, 28, 32, 34, tear perforations 26, and the proper edge geometry. Then, the still continuous filter roll is fed onto cardboard rolls, where it is spun until a predetermined quantity of filters is disposed on each of the rolls. After the predetermined quantity of filters is disposed on each of the rolls, each roll is cut, and each roll is placed in its packaging (e.g., in its box). In some embodiments, the coffee filters initially may be pressed by the first and second rollers in an arrangement comprising 5-10 coffee filters in a width direction. After which, the roll comprising 5-10 coffee filters in the width direction may be sliced lengthwise so that the continuous sheets of coffee filters may be fed onto multiple rolls.

In accordance with yet another aspect of one or more embodiments of the present invention, a method of dispensing rolled coffee filters 10, 10' will be described hereinafter while generally referring to the dispensing systems illustrated in FIGS. 12-14. Initially, the coffee filter roll 100 is advanced such that at least a portion of one of the plurality of coffee filters 10, 10' becomes unrolled from the coffee filter roll 100. When a dispenser housing is provided that substantially encloses the coffee filter roll 100, such as in the dispensing systems 200, 300, a portion of at least one of the plurality of coffee filters 10, 10' passes through the elongated aperture 204, 304 in the dispenser housing 202, 302 such that it is exposed outside the dispenser housing 202, 302. When the dispensing system is a manual-type dispenser, such as the dispensing system 200 in FIG. 12, the advancing of the coffee filter roll 100 is manually performed by a user pulling on the exposed end portion of the roll 100. In contrast, when the dispensing system is a automatic-type dispenser, such as the dispensing system 300 in FIG. 14, the coffee filter roll 100 is automatically advanced by an actuating means, such as the geared actuator rollers 306 in the dispenser housing 302. After the coffee filter roll 100 is sufficiently advanced either manually or automatically, the endmost coffee filter 10, 10' is separated from the remainder of the coffee filter roll 100 by tearing the coffee filter 10, 10' being removed from the adjacent coffee filter 10, 10' in the coffee filter roll 100 along at least one of the plurality of lines of weakness 26 (i.e., tear perforations 26).

It is readily apparent that the aforedescribed coffee filter roll 100, coffee filter dispensing systems 200, 300, and method of dispensing rolled coffee filters offer numerous advantages. First, the coffee filter roll 100 and coffee filter dispensing systems 200, 300 using the same provide people with quick and convenient access to coffee filters, and ensure only one filter is used at a time. Moreover, the coffee filter roll 100 and coffee filter dispensing systems 200, 300 described herein protect the coffee filters 10, 10' from contaminants while stored away, and they reduces the overall amount of time it takes to make coffee. Finally, the coffee filter roll 100 and coffee filter dispensing systems 200, 300 are ideal for use in both residential and commercial settings. Similar benefits are enjoyed by practicing the method of dispensing rolled coffee filters described herein.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A coffee filter roll comprising, in combination:
a plurality of coffee filters successively arranged in a roll configuration, each of said plurality of coffee filters being detachably coupled to one another, and each of said plurality of coffee filters including a plurality of fold lines configured to facilitate an insertion of each of said plurality of coffee filters into a coffee filter basket of a coffee maker, said plurality of fold lines on each of said plurality of coffee filters being arranged in a plurality of generally V-shaped sectors, each of said plurality of generally V-shaped sectors being circumferentially spaced apart from one another about a circumference of said coffee filter, each of said plurality of generally V-shaped sectors having a plurality of V-shaped fold lines, wherein each of said plurality of generally V-shaped sectors and said plurality of V-shaped fold lines converge to a respective tip; and
a plurality of lines of weakness, each of said plurality of lines of weakness being disposed between adjacent said coffee filters in said coffee filter roll;
wherein each of said plurality of coffee filters is configured to be separated from said coffee filter roll by tearing said coffee filter being removed from said adjacent coffee filter in said coffee filter roll along at least one of said plurality of lines of weakness; and
wherein, in a folded state, each of said plurality of coffee filters comprises a circular base perimeter with said respective tips of each of said plurality of generally V-shaped sectors and said plurality of V-shaped fold lines consecutively spaced apart about said circular base perimeter.

2. The coffee filter roll according to claim 1, wherein each of said plurality of coffee filters is generally octagonal in shape with a plurality of octagonal sides, and wherein each interior one of said plurality of coffee filters comprises said lines of weakness on opposed said octagonal sides thereof.

3. The coffee filter roll according to claim 2, wherein said octagonal sides of each of said plurality of coffee filters are spaced apart from one another by substantially V-shaped notches.

4. The coffee filter roll according to claim 1, wherein a filter media forming said coffee filter roll comprises a single-ply material.

5. The coffee filter roll according to claim 1, wherein each of said plurality of generally V-shaped sectors comprises a plurality of inner said fold lines bounded by a pair of outer said fold lines.

6. The coffee filter roll according to claim 1, wherein said plurality of fold lines on each of said plurality of coffee filters include a circular fold line centrally located on each said coffee filter, said circular fold line forming said circular base perimeter in said folded state of each of said plurality of coffee filters.

7. The coffee filter roll according to claim 1, wherein each of said plurality of fold lines on each of said plurality of coffee filters comprises a plurality of micro-perforations.

8. The coffee filter roll according to claim 1, wherein each of said plurality of lines of weakness comprises a plurality of spaced apart elongate perforations.

9. A coffee filter dispensing system comprising, in combination:
a coffee filter roll that includes:
a plurality of coffee filters successively arranged in a roll configuration, each of said plurality of coffee filters being detachably coupled to one another, and each of said plurality of coffee filters including a plurality of fold lines configured to facilitate an insertion of each of said plurality of coffee filters into a coffee filter basket of a coffee maker, said plurality of fold lines on each of said plurality of coffee filters being arranged in a plurality of generally V-shaped sectors, each of said plurality of generally V-shaped sectors being circumferentially spaced apart from one another about a circumference of said coffee filter, each of said plurality of generally V-shaped sectors having a plurality of V-shaped fold lines, wherein each of said plurality of generally V-shaped sectors and said plurality of V-shaped fold lines converge to a respective tip; and
a plurality of lines of weakness, each of said plurality of lines of weakness being disposed between adjacent said coffee filters in said coffee filter roll; and
a dispenser housing substantially enclosing said coffee filter roll, said dispenser housing including an elongated aperture for allowing the passage of unrolled ones of said plurality of coffee filters therethrough;
wherein each of said plurality of coffee filters is configured to be separated from said coffee filter roll by tearing said coffee filter being removed from said adjacent coffee filter in said coffee filter roll along at least one of said plurality of lines of weakness; and
wherein, in a folded state, each of said plurality of coffee filters comprises a circular base perimeter with said respective tips of each of said plurality of generally V-shaped sectors and said plurality of V-shaped fold lines consecutively spaced apart about said circular base perimeter.

10. The coffee filter dispensing system according to claim 9, wherein said dispenser system is in the form of an automatic dispenser, and wherein said coffee filter roll is configured to be automatically unrolled by an actuator disposed inside said dispensing housing.

11. The coffee filter dispensing system according to claim 10, wherein said automatic dispenser comprises a sensor device for detecting a presence of a user, said sensor device being operatively coupled to said actuator so that said coffee filter roll is capable of being automatically advanced when said presence of said user is detected by said sensor device.

12. The coffee filter dispensing system according to claim 9, wherein each of said plurality of coffee filters is generally octagonal in shape with a plurality of octagonal sides, and wherein said octagonal sides of each of said plurality of coffee filters are spaced apart from one another by substantially V-shaped notches.

13. A method of dispensing rolled coffee filters, said method comprising the steps of:
   providing a coffee filter roll that includes:
      a plurality of coffee filters successively arranged in a roll configuration, each of said plurality of coffee filters being detachably coupled to one another, and each of said plurality of coffee filters including a plurality of fold lines configured to facilitate an insertion of each of said plurality of coffee filters into a coffee filter basket of a coffee maker, said plurality of fold lines on each of said plurality of coffee filters being arranged in a plurality of generally V-shaped sectors, each of said plurality of generally V-shaped sectors being circumferentially spaced apart from one another about a circumference of said coffee filter, each of said plurality of generally V-shaped sectors having a plurality of V-shaped fold lines, wherein each of said plurality of generally V-shaped sectors and said plurality of V-shaped fold lines converge to a respective tip; and
      a plurality of lines of weakness, each of said plurality of lines of weakness being disposed between adjacent said coffee filters in said coffee filter roll;
   advancing said coffee filter roll such that at least a portion of one of said plurality of coffee filters becomes unrolled from said coffee filter roll; wherein, in a folded state, each of said plurality of coffee filters comprises a circular base perimeter with said respective tips of each of said plurality of generally V-shaped sectors and said plurality of V-shaped fold lines consecutively spaced apart about said circular base perimeter; and
   separating said one of said plurality of coffee filters from a remainder of said coffee filter roll by tearing said coffee filter being removed from said adjacent coffee filter in said coffee filter roll along at least one of said plurality of lines of weakness.

14. The method according to claim 13, further comprising the step of:
   providing a dispenser housing that substantially encloses said coffee filter roll, said dispenser housing including an elongated aperture for allowing the passage of unrolled ones of said plurality of coffee filters therethrough; and
   wherein the step of advancing said coffee filter roll comprises advancing said coffee filter roll such that at least a portion of said one of said plurality of coffee filters passes through said elongated aperture of said dispenser housing and is exposed outside said dispenser housing.

* * * * *